J. B. CORRIGAN.
ANIMAL TRAP.
APPLICATION FILED AUG. 9, 1918.
1,308,277. Patented July 1, 1919.
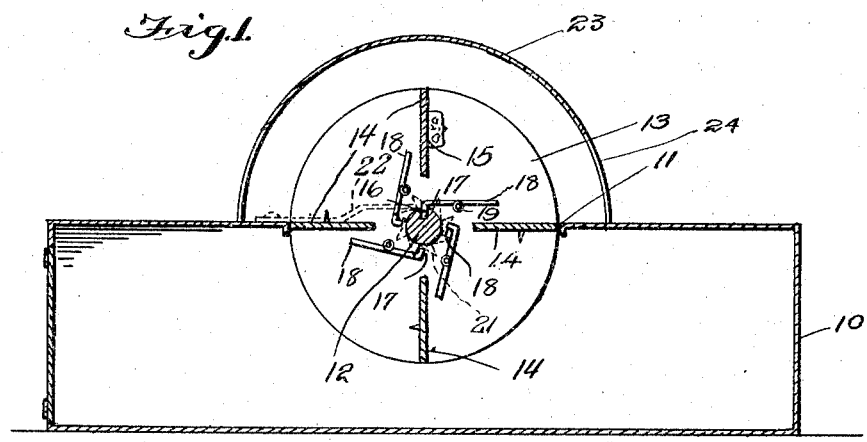
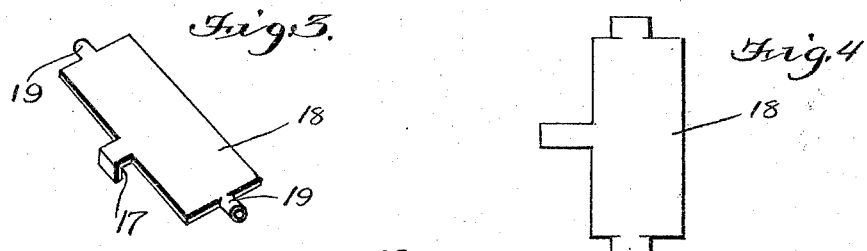
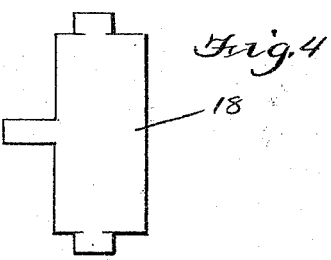
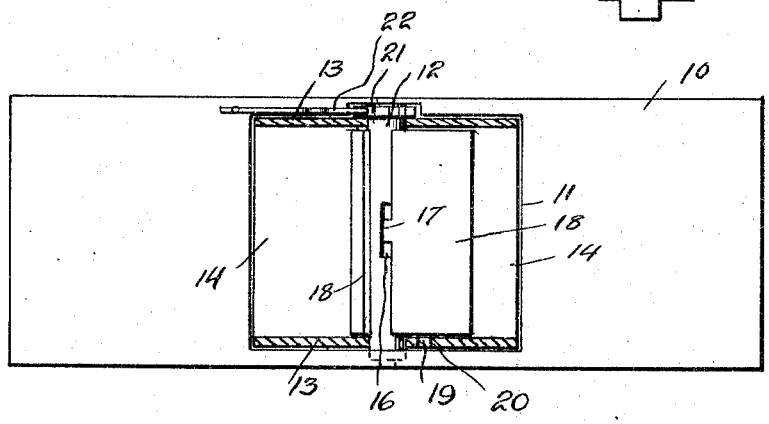
Inventor
J. B. Corrigan
Attorney

UNITED STATES PATENT OFFICE.

JOHN B. CORRIGAN, OF PRIOR LAKE, MINNESOTA.

ANIMAL-TRAP.

1,308,277.   Specification of Letters Patent.   Patented July 1, 1919.

Application filed August 9, 1918. Serial No. 249,120.

*To all whom it may concern:*

Be it known that I, JOHN B. CORRIGAN, a citizen of the United States, residing at Prior Lake, in the county of Scott, State of Minnesota, have invented certain new and useful Improvements in Animal-Traps; and I do hereby declare the following to be a full, clear, and exact description of the invention, such as will enable others skilled in the art to which it appertains to make and use the same.

This invention relates to new and useful improvements in traps and particularly to animal traps of the self-set and ever-set type.

One object of the present invention is to provide a novel and improved trap of this character wherein great efficiency is combined with great economy of material.

A further object is to provide a device of this character wherein the device is simple and cheap in its construction, effective in its operation, and capable of comparatively hard usage.

A further object is to provide a novel and improved device of this character wherein means are provided for holding the trapping member of the trap against movement until a trip or detent is actuated by the animal in its attempt to reach the bait, thus insuring that the animal will dispose itself entirely on the trapping member before the trapping action takes place.

Other objects and advantages will be apparent from the following description when taken in connection with the accompanying drawing.

In the drawing:

Figure 1 is a vertical longitudinal sectional view through a trap made in accordance with my invention.

Fig. 2 is a horizontal sectional view taken on the line 2—2 of Fig. 1.

Fig. 3 is an enlarged perspective view of the trip plate removed from the trap.

Fig. 4 is a plan view of the blank from which the trip plate is formed.

Referring particularly to the accompanying drawing, 10 represents a suitably sized and shaped receptacle in the top wall of which there is formed a rectangular opening 11. Extending transversely across the intermediate portion of this opening, and secured at its ends to the top wall of the receptacle against rotatable movement, is a shaft 12. A pair of disks 13 are mounted on this shaft for rotation thereon and disposed within said opening, said disks being connected together by means of the radially extending and equally spaced blades 14. In normal, or set position of the trap, two of the blades will dispose themselves in horizontal position on a level with the portions of the top of the receptacle, at the ends of the opening 11, while the other two blades will stand in vertical planes, and at right angles to the first-mentioned blades. Carried by one face of each of the blades is a small receptacle 15 in which is placed the bait. In the shaft 12 there is formed a notch 16 which is adapted to receive the downwardly turned nose 17 of the trip plate or detent 18. This detent is formed from an elongated strip of metal from opposite sides of which there extend the trunnions 19. These trunnions are journaled in openings 20 formed in the disks 13. Normally the nose of the detent engages in the notch of the shaft, and when the animal steps on the blade the disks will not rotate, but when the animal steps on the outer end of the detent in an attempt to reach the bait in the receptacle 15, the detent will be depressed and the nose released from the notch of the shaft, with the result that the weight of the animal will cause the rotation of the wheel formed by the disks and blades, and be precipitated into the receptacle 10, through the opening 11. The momentum imparted to the wheel or drum will carry it around until the next detent engages with the notch of the shaft, the wheel being then held against any further movement.

Carried by one end of the shaft, is a ratchet wheel 21 which is engaged by a pawl 22 carried by the top of the receptacle 10, whereby retrograde movement of the wheel is prevented.

It will be noted that the noses of three of the detents rest on the curved face of the shaft in position to drop into the notch when the wheel is rotated the proper distance. When the detent engages in the notch of the shaft it prevents further rotation of the wheel, and thus holds one of the blades in a position flush or level with the top of the receptacle 10.

A curved housing 23 is secured to the top of the receptacle 10 and partially covers the portion of the wheel above the opening 11, whereby an entrance opening 24 is provided for the animals to gain access to the blade and the bait.

The device, when constructed in the form shown and described, will produce a trap which is simple in construction, formed of the minimum number of parts, is durable, and is such that the initial cost of the manufacture is comparatively low, thereby permitting competition with other similar devices on the market.

What is claimed is:

An animal trap including a receptacle having an opening in the top thereof, a rotatable member disposed in said opening and having a pair of parallel spaced disks, radially extending blades secured between and spacing the disks apart, a shaft fixed across the opening and having the disks and blades loosely rotatable thereon, said shaft having a notch therein, detent members pivotally mounted on the disks and disposed therebetween and having noses for engagement in said notch to hold the rotatable member against movement in one direction until released by the animal, each of said detents being disposed within the angle formed by each pair of blades, and a member disposed in covering relation to a part of the upper portion of the rotatable member.

In testimony whereof I affix my signature in the presence of two witnesses.

JOHN B. CORRIGAN.

Witnesses:
WILLIAM NEE,
PETER RING.